Dec. 16, 1958  W. J. BRADBURN, JR., ET AL  2,864,989
ADJUSTABLE SPEED DRIVE FOR D. C. ELECTRIC MOTORS
Filed Dec. 5, 1956
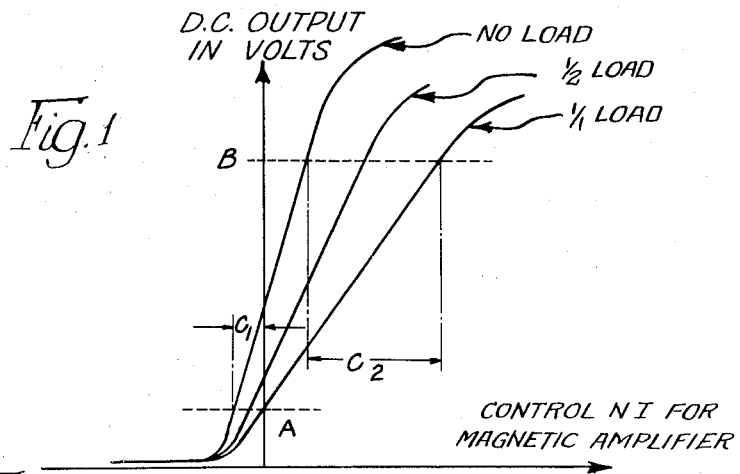
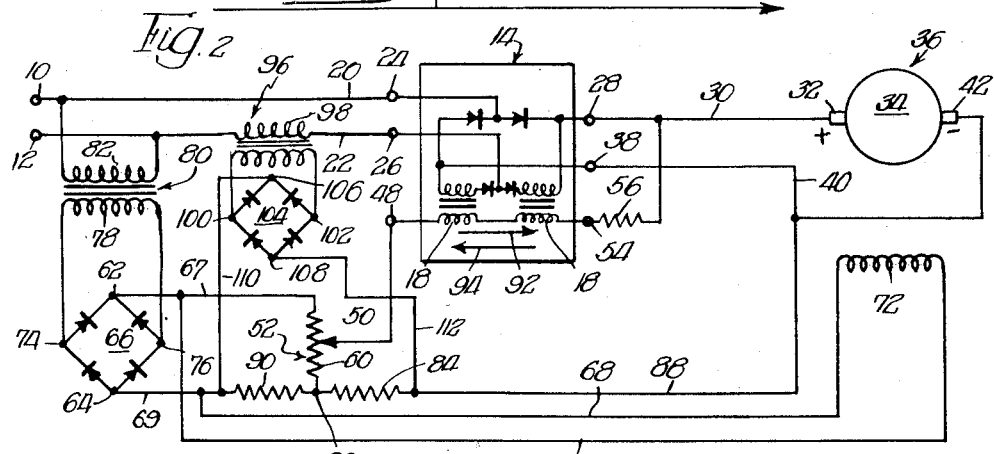
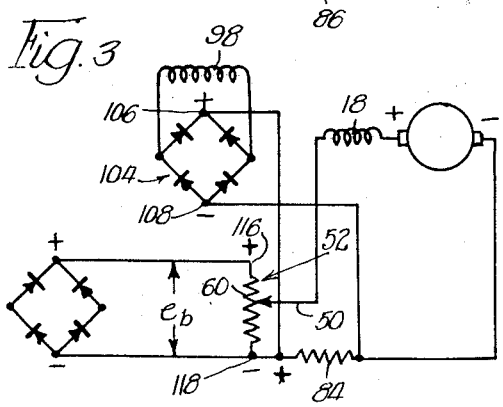
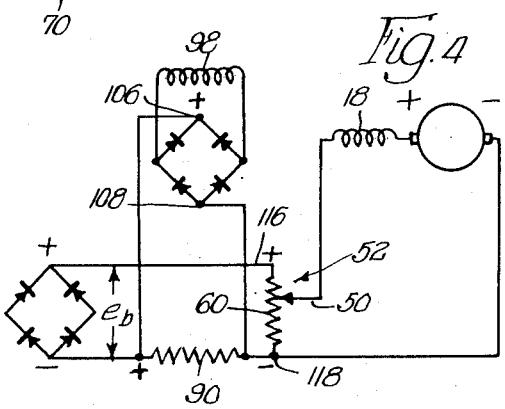
INVENTORS
William J. Bradburn, Jr.,
Hans Richard Ansgar Hansen,
Wilkinson, Huxley,
Byron & Hume Attys United States Patent Office 2,864,989
Patented Dec. 16, 1958

2,864,989

ADJUSTABLE SPEED DRIVE FOR D. C. ELECTRIC MOTORS

William J. Bradburn, Jr., Milwaukee, and Hans Richard Ansgar Hansen, St. Francis, Wis., assignors to The Louis Allis Co., Milwaukee, Wis., a corporation of Wisconsin Application December 5, 1956, Serial No. 626,443

4 Claims. (Cl. 318—331)

This invention relates to speed circuits for electric motors and more particularly to a circuit which provides an adjustable speed drive for operation on A. C. power utilizing a magnetic amplifier control circuit for a D. C. electric motor.

This application is a continuation-in-part of co-pending application, Serial No. 385,986, which was filed in the name of the present applicants and Marvin W. Osborn on October 14, 1953.

One of the objects of this invention is to provide an adjustable speed drive which can be operated from an A. C. power line and which has a wide speed range and good speed regulation.

Still another object is to provide a speed drive of the character described which is low in cost and simple in both construction and operation but which is at the same time quick in its response to load changes and which is self-regulating in spite of such load changes.

Another object is to provide a circuit of the character described in which novel provision is made for both speed drop compensation due to the IR drop in the motor and compensation for the change in control ampere turns under varying load conditions.

Another object is to provide a control circuit which may use a variation in the voltage applied across either the armature or the field of the motor as a means of adjusting the speed thereof.

Further objects and advantages of this invention will become evident as the description proceeds and from an examination of the accompanying drawing which illustrates one embodiment of the invention and in which similar numerals refer to similar parts throughout the several views.

In the drawings:

Figure 1 is a graphical representation of the change in control ampere turns of a magnetic amplifier in an adjustable speed drive for a D. C. motor under conditions of varying load.

Figure 2 is a circuit diagram illustrating one embodiment of the invention with some of the elements thereof being shown more or less diagrammatically.

Figure 3 is a circuit diagram showing the equivalent circuit of a portion of the circuit shown in Figure 2.

Figure 4 is another circuit diagram showing the equivalent circuit of a portion of the circuit shown in Figure 2.

It has been previously proposed that a current transformer be utilized as a means of sensing the magnitude of the current flowing to the magnetic amplifier in an adjustable speed drive of the general character disclosed herein. United States Patent No. 2,558,086, issued to L. W. Herchenroeder on June 26, 1951, contains a disclosure of this general nature. Likewise, the co-pending application, Serial No. 385,986, referred to above, discloses the use of a current transformer in this fashion.

In such instances the output of the current transformer has been applied across a resistor in the control winding circuit for the magnetic amplifier so that compensation is attained for the IR drop in the motor armature for example. Such compensation, however, does not make provision for the observed magnetic amplifier characteristics shown in Figure 1. The characteristics are those of a low gain magnetic amplifier with D. C. motor armature loading and represent a plot of D. C. output volts against control ampere turns wherein the armature voltage (motor speed) and the armature current (motor load) are varied. From the plot it is evident that the change in control ampere turns necessary to maintain a constant armature voltage from a no load current condition to a full load current condition varies as the armature voltage varies. Specifically, at a low armature voltage A the change in control ampere turns necessary to maintain the armature voltage constant from a no load to a full load current is $C_1$ and at a higher armature voltage B the change in control ampere turns necessary to maintain the output voltage constant from a no load to a full load current is $C_2$, increased over $C_1$ in proportion as the armature voltage B is increased over the armature voltage A. It is significant that these characteristics appear with predominance only in low gain magnetic amplifiers having armature loading and not in high gain magnetic amplifiers having armature loading. It is believed that these characteristics are not caused by the loading D. C. motor but are inherent in low gain magnetic amplifiers provided with a capacitative type loading such as characterized by the armature of a D. C. motor. Accordingly, when a low gain magnetic amplifier is used as an armature voltage regulator, it is necessary for purposes of good motor speed regulation to compensate the magnetic amplifier for changes in control ampere turns with variations in load voltages. Compensation may be accomplished by including in the motor drive arrangement a control circuit which provides to the control winding of the magnetic amplifier a signal that increases as the armature voltage of the D. C. motor increases.

A form of circuit which will compensate both for normal IR drops and for the previously mentioned change in control ampere turns is disclosed in Figure 2. In this circuit the terminals 10 and 12 represent the input terminals to the system to which a source of line voltage may be connected, such as a 220 volt supply at 60 cycles per second. A magnetic amplifier is indicated generally by the numeral 14 and is provided with the series connected control windings 18—18. The two lines 20 and 22 connect the input terminals 24 and 26 of the magnetic amplifier 14 to the alternating current input terminals 10 and 12 for the system. One of the output terminals 28 of the magnetic amplifier 14 is connected through the line 30 to the armature 34 of the controlled motor 36 at 32. The other output terminal 38 is connected through the line 40 to the armature 34 at 42.

The input terminal 48 for the control windings 18—18 is connected to the movable arm 50 of the potentiometer indicated generally by the numeral 52. The other input terminal 54 for the control windings 18—18 is connected through the resistor 56 to the output line 30 of the magnetic amplifier 14. The resistance 60 of the potentiometer 52 is connected in series with the resistor 90 across the output terminals 62 and 64 of the full wave rectifier, indicated generally by the numeral 66, by the lines 67 and 69. These two terminals are likewise connected by the lines 68 and 70 across the field winding 72 of the motor. The input terminals 74 and 76 of the rectifier 66 are connected across the secondary winding 78 of the transformer indicated generally by the numeral 80. The primary winding 82 of the transformer 80 is connected across the lines 20 and 22 carrying the alternating current input.

The circuit described therefore has the output of the magnetic amplifier impressed across the armature 34 of the motor. A control circuit is also connected across the armature 34 which has disposed in series therein the control windings 18—18 of the magnetic amplifier 14, a selected portion of the resistance 60 of the potentiometer 52, and the resistor 84, one end of which is connected to the end 86 of the resistance 60 and the other end being connected through the line 88 to the line 40. The transformer 80, the rectifier 66 and the resistance 60, together with the resistor 90 connected between the end 86 of the resistance 60 and the output terminal 64 of the rectifier 66, provide a source of constant bias voltage, a selected portion of which is applied to the control circuit just mentioned causing control current to flow in the direction of the arrow 92 in the control windings 18—18. At the same time a feedback signal will be applied to the control windings 18—18 since they are connected so that the output voltage of the magnetic amplifier 14 will tend to create a current flow in the direction of the arrow 94. Under normal conditions of operation, there will be a flow of current in one direction or the other since the voltages impressed on control windings 18—18 will normally not be equal in magnitude. Therefore, for example, if the movable arm 50 of the speed setting potentiometer 52 is moved to increase the positive potential of arm 50 (which is the voltage tending to produce a current flow in the direction of the arrow 92) the output of the magnetic amplifier 14 will also be increased, control windings 18—18 being wound in the proper direction to produce this result. Under conditions of stable operation, the difference between the impressed control voltage and the output of the magnetic amplifier will follow a definite pattern. Likewise, under abnormal operating conditions wherein this balance is momentarily destroyed, the circuit is designed to automatically make its own correction. For example, if the control voltage is increased without producing a corresponding increase in the voltage output of the magnetic amplifier, the current flow in the control windings 18—18 will be such as to cause the output of the magnetic amplifier to increase until the original balance is restored.

For a certain setting of the potentiometer 52 the arrangement described thus far would tend to regulate on constant armature voltage if the difference between the control ampere turns for the magnetic amplifier at high load and at no load were negligible. That would be the case if a high gain magnetic amplifier was used. However, it is necessary to use fairly low gain amplifiers for reasons of economy. Furthermore, even if the armature voltage was kept constant, there would be a speed drop from no load to full load due to the IR drop in the motor armature circuit.

The arrangement in Figure 2 provides means for compensation for speed drop not only due to the IR drop in the motor armature circuit, but also for speed drop due to the changing excitation requirement of the magnetic amplifier. Such compensation is obtained by introducing into the control circuit a compensating voltage with two components: one component compensating for IR drop, and the other compensating for the change in excitation requirement of the magnetic amplifier.

Because the IR drop in the armature circuit is substantially proportional to the armature current, the first of the two components of the compensating voltage should be proportional to armature current.

As previously mentioned and as shown in Figure 1, the change which occurred under conditions of varying load in the control ampere turns in the magnetic amplifier in a system such as is shown in Figure 2 is substantially proportional not only to load current but also to motor speed. In providing the two compensating voltage components in the control circuit for the magnetic amplifier, it is, therefore, highly desirable that the second component be proportional to the product of armature current and motor speed.

To this end a current transformer 96 is provided with its primary winding 98 connected in series with the A. C. supply line 22. The secondary winding of this current transformer is connected across the input terminals 100 and 102 of the full wave rectifier 104. The two resistors 84 and 90 are connected in series across the output terminals 106 and 108 of this rectifier by the lines 110 and 112. In addition, the resistor 84 is connected in series with the potentiometer 52 and the control winding 18 while the resistor 90 is connected in series with the potentiometer 52 and the output terminals of the full wave rectifier 66. Such an arrangement provides the type of compensating voltages described above as being desirable and the manner in which this is accomplished is diagrammatically indicated in Figures 3 and 4. The resistor 84, for example, is so connected in the circuit that the voltage drop thereover, due to the current supplied from the rectifier 104, forms a component which is essentially proportional to the load current and this voltage is added to the selected portion of the voltage drop across the resistance 60 of the potentiometer 52. As can be seen from Figure 3, regardless of the setting of the movable arm 50 of the potentiometer 52, the compensating voltage produced by the resistor 84 will be added in its entirety to the voltage picked off by the movable arm 50. More specifically, if the voltage drop from the point 116 to the point 118 is 150 volts and if the movable arm 50 is set so that the portion applied to the control winding 18 is 75 volts and assuming that the voltage drop across the resistor 84 is 10 volts, the resultant voltage applied to the control circuit will be 85 volts. If the speed setting is changed but the load current remains the same, 10 volts will again be added by the resistor 84.

As shown in Figure 4, however, if we assume the voltage drop across the resistor 90 is 10 volts, then the voltage drop from the point 116 to 118 across the potentiometer 52 is 150 plus 10 or 160 volts. If the movable arm 50 of the potentiometer 52 is set as before, the portion of the voltage picked off thereby will be 80 volts. In other words, the amount of compensation voltage added by the resistor 90 is proportional not only to the load current but also is proportional to the setting of the movable arm 50 for the speed setting of the adjustable speed drive which is exactly the result which is sought in order to compensate for the change in control ampere turns previously described.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

What is claimed is:

1. In an adjustable speed drive, a motor control circuit for a direct current motor having a shunt field winding and an armature, comprising: an internally self-saturated magnetic amplifier having input terminals for alternating current, output terminals for a full wave direct current and additional input terminals for control winding means; means for supplying a constant direct current voltage to said motor; means connecting the output voltage terminals of said magnetic amplifier to said motor, one of said voltages being applied across said armature and one being applied across said field winding of said motor; a speed-setting potentiometric resistor having a variable tap thereon, said resistor being connected across said means for supplying a constant direct current voltage; and circuit means providing a direct current proportional to the current supplied to said magnetic amplifier, and multiple resistance means across which said last named direct current is applied and across a portion of which said first named direct current is applied to produce a motor IR drop compensation voltage and a control ampere turn compensation voltage, the remaining portion of said multiple resistance means, said control winding means and the tapped portion of said potentiometric resistor being series connected across the output terminals of said magnetic amplifier.

2. In an adjustable speed drive, a motor control circuit for a direct current motor having a shunt field winding and an armature, comprising: an internally self-saturated magnetic amplifier having input terminals for alternating current, output terminals for a full wave direct current and additional input terminals for control winding means; means for supplying a constant direct current voltage to said motor; means connecting the output voltage terminals of said magnetic amplifier to said motor, one of said voltages being applied across said armature and one being applied across said field winding of said motor; a speed-setting potentiometric resistor having a variable tap thereon, said resistor being connected across said means for supplying a constant direct current voltage; and means for providing a motor IR drop compensation voltage and a control ampere turns compensation voltage comprising a current transformer having a primary winding connected in series with one of the input terminals of said magnetic amplifier and a secondary winding connected across the input terminals of a full wave rectifier means, the output terminals of the latter being connected across a resistance means, a portion of said resistance means, said control winding means and the tapped portion of said potentiometric resistor being series connected across the output terminals of said magnetic amplifier.

3. An adjustable speed drive having alternating current input terminals comprising: a direct current motor having a shunt field winding and an armature; an internally self-saturated magnetic amplifier having inpunt terminals connected across said first named input terminals, output terminals supplying a full wave direct current voltage and additional input terminals for control winding means; transformer means having a primary winding connected across said first named input terminals; rectifier means, the input terminals of which are connected across the secondary winding of said transformer means; means applying the output voltage of said rectifier means to said motor; means applying the output voltage of said magnetic amplifier to said motor, one of said voltages being applied across said armature and one being applied across said field winding of said motor; a speed-setting potentiometric resistor having a variable tap thereon, said potentiometric resistor being connected in series with a first resistor across the output terminals of said rectifier means; circuit means providing a direct current proportional to the current supplied to said magnetic amplifier; and a second resistor connected in series with said first resistor at the end thereof adjacent said potentiometric resistor, said first and second resistors being series connected across the output of said circuit means, and said control winding means, the tapped portion of said potentiometric resistor and said second resistor being series connected across the output terminals of said magnetic amplifier.

4. In a motor control circuit for a direct current motor having a shunt field winding and an armature, an internally self-saturated magnetic amplifier having input terminals for alternating current, output terminals for a full wave direct current and additional input terminals for control winding means; means for supplying a constant direct current voltage to said motor; means connecting the output voltage terminals of said magnetic amplifier to said motor, one of said voltages being applied across said armature and one being applied across said field winding of said motor; a speed-setting potentiometric resistor having a variable tap thereon, said resistor being connected across said means for supplying a constant direct current voltage; circuit means providing a direct current proportional to the current supplied to said magnetic amplifier and additional circuit means for providing a voltage component proportional to said direct current independently of the setting of said potentiometric resistance and a second component which varies in proportion to said direct current but the magnitude of which changes with the setting of said potentiometric resistance; and means for applying said voltage components to said control winding means along with the voltage from the tapped portion of said potentiometric resistance and the back E. M. F. of said motor.

References Cited in the file of this patent

UNITED STATES PATENTS

| 2,558,086 | Herchenroeder | June 26, 1951 |
| 2,683,847 | McLane et al. | July 13, 1954 |

FOREIGN PATENTS

| 1,048,540 | France | Aug. 5, 1953 |
| 1,054,387 | France | Oct. 7, 1953 |